(12) United States Patent
Interdonato

(10) Patent No.: US 8,374,657 B2
(45) Date of Patent: Feb. 12, 2013

(54) FINGER HOLDER FOR HANDHELD COMMUNICATION UNITS

(75) Inventor: Rich Interdonato, Salt Lake City, UT (US)

(73) Assignee: Rich Interdonato, Salt Lake City, UT (US)

( * ) Notice: Subject to any disclaimer, the term of this patent is extended or adjusted under 35 U.S.C. 154(b) by 298 days.

(21) Appl. No.: 12/584,749

(22) Filed: Sep. 11, 2009

(65) Prior Publication Data
US 2010/0222118 A1 Sep. 2, 2010

Related U.S. Application Data

(60) Provisional application No. 61/156,453, filed on Feb. 27, 2009.

(51) Int. Cl.
*H04M 1/00* (2006.01)
(52) U.S. Cl. ............... 455/575.4; 455/575.3; 455/575.2; 455/575.1; 455/566; 455/550.1; 455/344; 455/117; 455/558; 379/433.07; 379/433.13
(58) Field of Classification Search ............. 455/550.1, 455/575.1, 575.6, 566, 575.3, 575.4, 90.3
See application file for complete search history.

(56) References Cited

U.S. PATENT DOCUMENTS

| | | | | |
|---|---|---|---|---|
| 7,707,973 B2 * | 5/2010 | Toelken | | 119/713 |
| 2003/0213886 A1 * | 11/2003 | Gilbert | | 248/454 |
| 2004/0104271 A1 * | 6/2004 | Martucci et al. | | 235/472.01 |
| 2004/0121798 A1 * | 6/2004 | Hamasaki et al. | | 455/550.1 |
| 2006/0189440 A1 * | 8/2006 | Gravagne | | 482/8 |
| 2006/0201594 A1 * | 9/2006 | Carmichael | | 150/143 |
| 2008/0242944 A1 * | 10/2008 | Sharma | | 600/300 |
| 2009/0270050 A1 * | 10/2009 | Brown | | 455/90.3 |
| 2010/0222118 A1 * | 9/2010 | Interdanato | | 455/575.6 |

FOREIGN PATENT DOCUMENTS

| | | | | |
|---|---|---|---|---|
| JP | 2006279907 A | * | 10/2006 | |
| JP | 2007036619 A | * | 2/2007 | |
| JP | 2007053603 A | * | 3/2007 | |

OTHER PUBLICATIONS

Machine translation of JP 2006-279907, Fujimori, Motoyoshi; published Oct. 2006.*

* cited by examiner

*Primary Examiner* — Joseph Arevalo
(74) *Attorney, Agent, or Firm* — Jeffrey K. Riddle; Van Cott, Bagley, Cornwall & McCarthy P.C.

(57) ABSTRACT

An apparatus having a loop device fastened to a communication unit that permits a user to securely hold the unit using one or more fingers inserted through a loop device for efficient and stable operation of a keyboard, touch screen, trackball or the like using the user's thumb.

17 Claims, 12 Drawing Sheets

FINGER HOLDER FOR HANDHELD COMMUNICATION UNITS

CROSS-REFERENCE TO RELATED APPLICATIONS

This application claims the benefit of U.S. Provisional Application No. 61/156,453, filed Feb. 27, 2009, which is hereby incorporated by reference herein in its entirety.

TECHNICAL FIELD OF THE INVENTION

The present invention relates to holders for handheld personal electronic communication units and, more particularly, holders configured to both attach to a communication unit and receive one or more fingers of a user in order to operate the unit by the user's thumb in a comfortable, stable and efficient manner.

BACKGROUND OF THE INVENTION

Handheld communication units, such a cellular telephones, personal digital assistants, music storage devices and gaming consoles, each having one or more keypads, touch screens or trackballs and the like, have and continue to become increasingly popular and widespread. As technology advances, the size and weight of such units reduces. Indeed, it is not uncommon at the time of this writing to see cellular telephones weighing but a few ounces and having height and width dimensions on the order of a few inches and thicknesses on the order of a fraction of an inch. While using such slender and lightweight communication units, it is not uncommon for the unit to slip from a user's hand and drop to the ground, being damaged in the process. Moreover, because the of the compactness of modern units, it is not uncommon for user's to experience Repetitive Stress Injuries (RSI) resulting from operating keyboards and the like, particularly by young people "texting" tens if not hundreds of messages daily. Further, as the devices become smaller and more compact, is becomes more difficult to hold the device while typing or keying or otherwise operating the device with the user's thumb.

The present invention seeks to address the difficulties associated with inadvertent dropping of a communications unit while, at the same time, providing a prophylactic measure against RSI, as well as other injuries, including, but not limited to, Text Messaging Injury (TMI), Nintenditis, and Blackberry Thumb. These injuries are likely to grow in significance as more and more people simultaneously operate and hold handheld devices using a single hand. Additional benefits arise in productivity as well—e.g., it is not only more comfortable to type messages or operate a compact console using a single hand, but is more efficient also. Indeed, the current invention even permits efficient operation of a communications unit or similar device while seated or laying horizontally—e.g., in a bed—with the communication unit being held by the user over his or her head.

SUMMARY OF THE INVENTION

A finger receiving device for holding a personal communication unit is disclosed. The finger receiving device includes a first loop portion configured to receive a finger of a user of the personal communication device and an overlay portion. The first loop portion has a length, an opening along the length and a perimeter about the opening that are all sized to receive a finger of the user and to fit with the overlay portion. The overlay portion secures the loop portion to the backside of the communication unit by affixing fore and aft base portions to the unit—e.g., using an adhesive. In various embodiments, the overlay portion has a width equal in magnitude to the length of the first loop portion, the first loop portion and the overlay portion are affixed to one another using an adhesive, or the overlay portion has a length greater than twice the perimeter of the first loop portion. In one embodiment, the overlay portion and the first loop portion constitute a single piece unit. Other embodiments include a second loop portion configured to receive a second finger of the user of the communication device, wherein the second loop portion may be positioned adjacent said first loop portion. Still further embodiments include only one of fore and aft base portions affixed to the communication unit. Materials used to construct the finger receiving device include elastic materials and adhesive tape. Beneficial aspects of the device include ease of use and the ability to incorporate identifying information into the device, such information including, for example, computer readable identification information residing on or in a barcode or a magnetic strip. The information may also be visual, such as a user's name, a corporate logo or printed medical or emergency contact information. Various other embodiments and uses of the device are described below in reference to the appended drawings and claims.

DETAILED DESCRIPTION OF THE INVENTION

Figure 1:
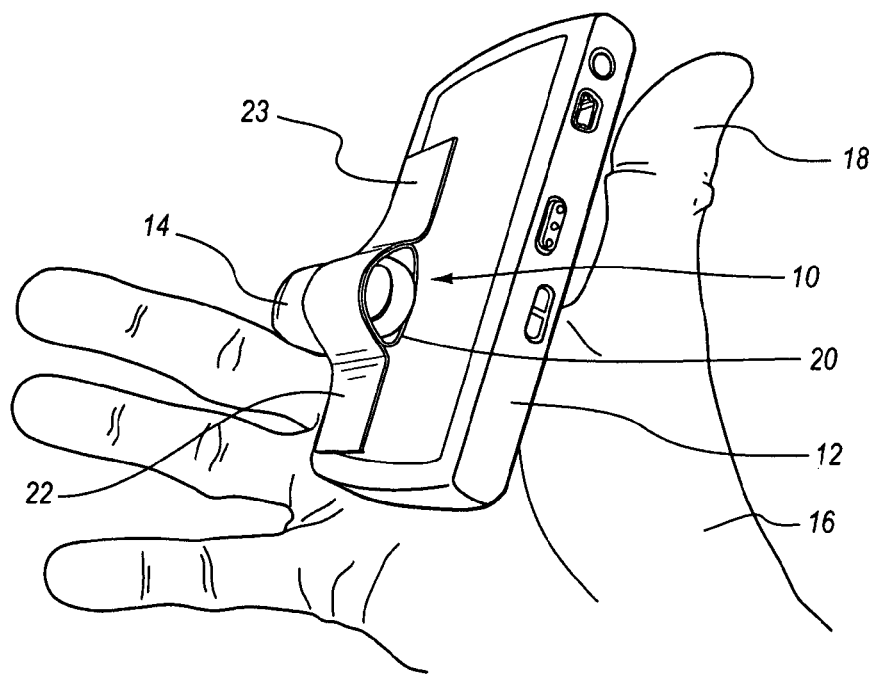
FIG. 1 illustrates a perspective view of a communications unit having one embodiment of the present invention affixed to the backside of the communications unit and a user's finger extending into a loop portion of the invention.
Figure 2:
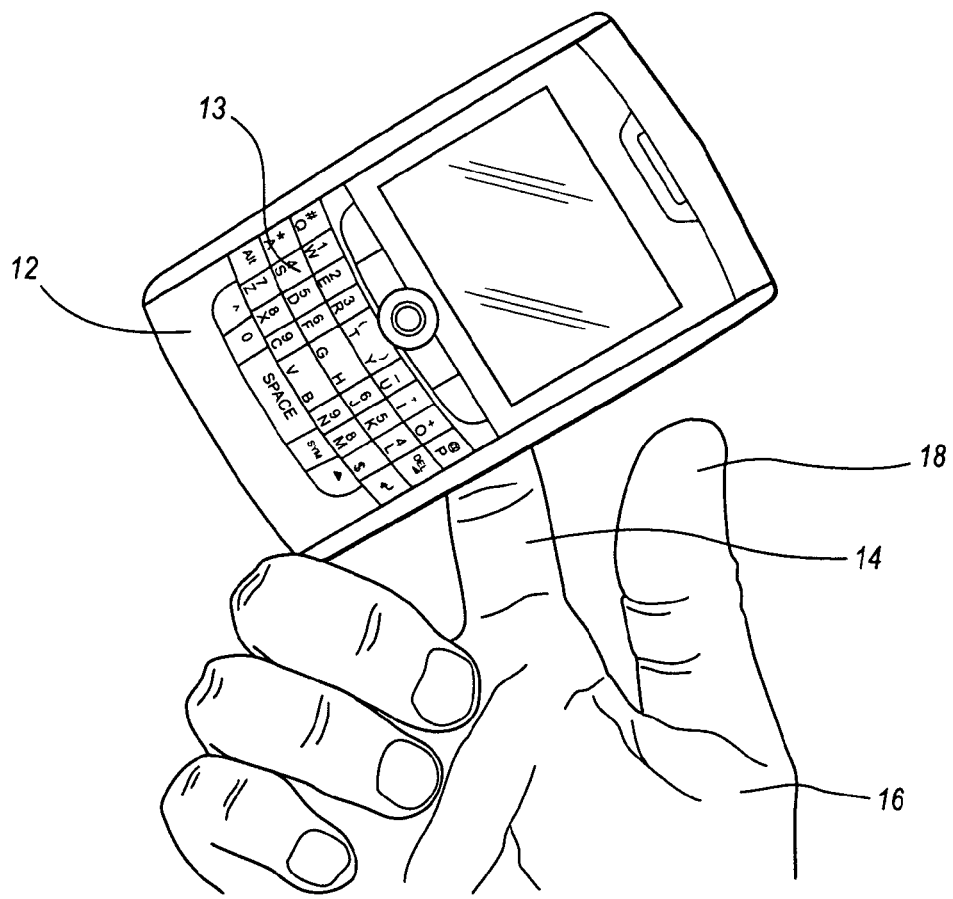
FIG. 2 illustrates a frontal perspective view of the illustration shown in FIG. 1.
Figure 3:
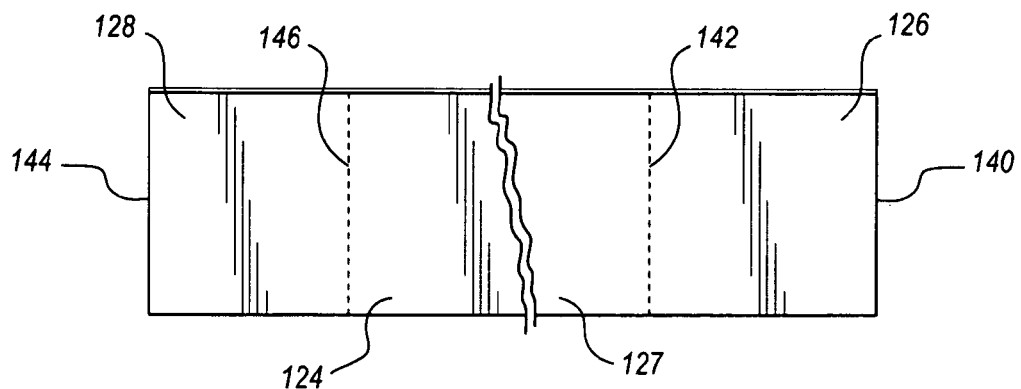
FIG. 3 illustrates a top view of an overlay portion of the embodiment of the present invention illustrated in FIG. 1.
Figure 4:
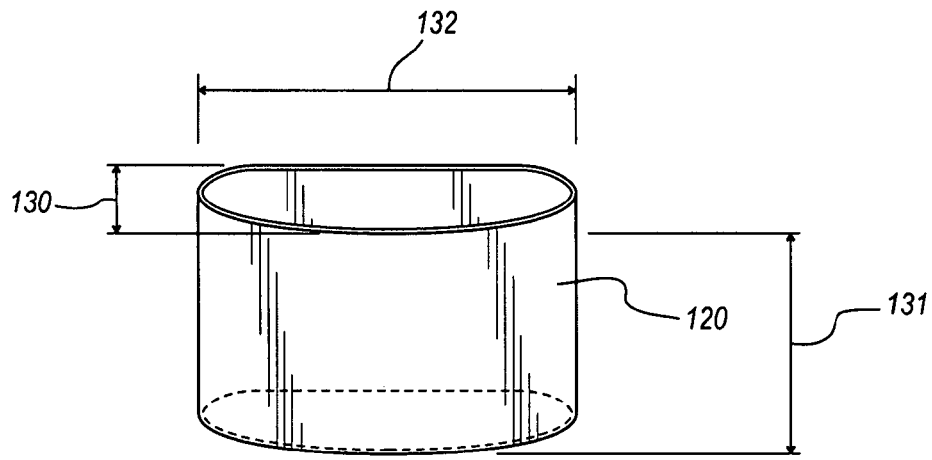
FIG. 4 illustrates a perspective view of the loop or finger receptacle portion of the embodiment of the present invention illustrated in FIG. 1.
Figure 5:
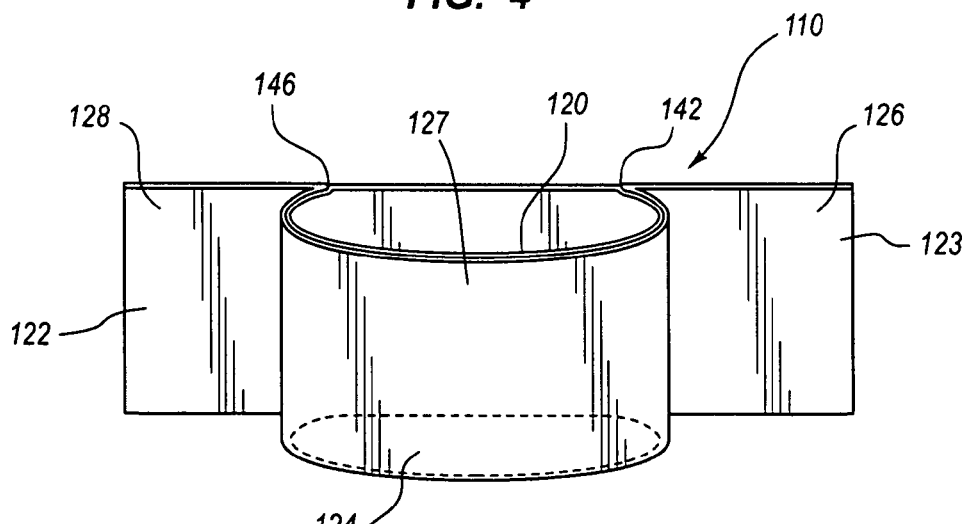
FIG. 5 illustrates a perspective view of the combination of overlay and finger receptacle portion illustrated in FIGS. 3 and 4.
Figure 6:
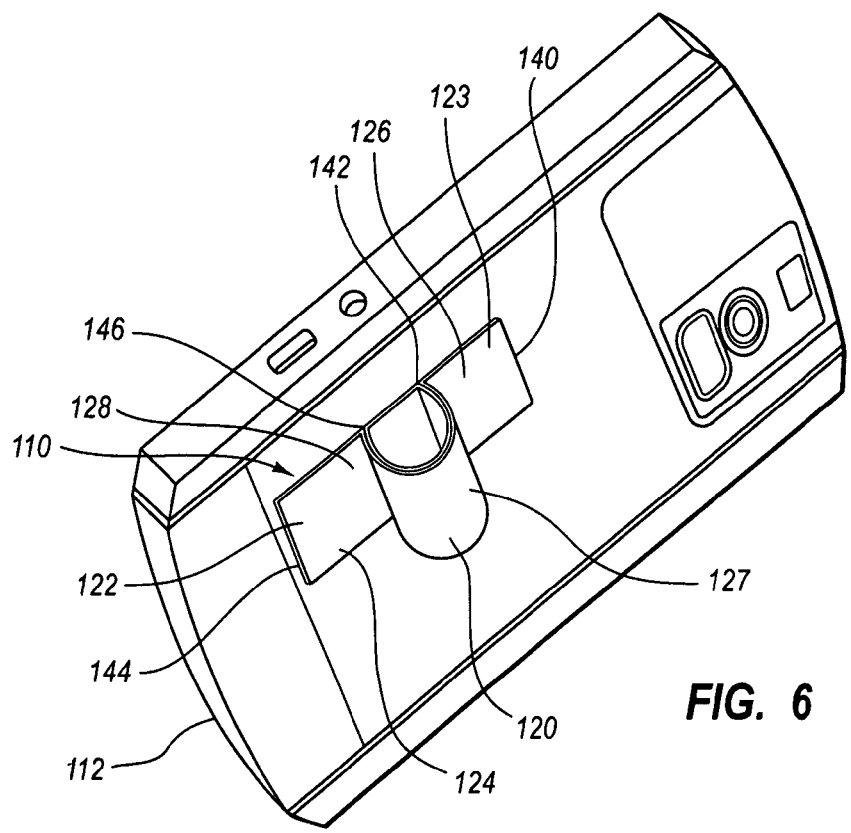
FIG. 6 illustrates a perspective view of the combination illustrated in FIG. 5 affixed to the backside of a communications unit.

The invention concerns apparatus and methods for holding handheld devices and, more particularly, holding personal electronic communication devices so as to be more easily operable by a user's fingers or thumb. Referring, for example, to FIGS. 1 and 2, one embodiment of the invention comprises a loop device 10 adapted and configured for affixation to a personal electronic communication unit 12, such as a cellular telephone or personal digital assistant (PDA), having a keypad or touch screen 13 for operation. The loop device 10 is configured and affixed on the communication unit 12 to receive a finger 14 (typically the index or middle finger) or two or more fingers of a user's hand 16 such that the user's thumb 18 is better positioned to operate the keypad or touch screen 13 of the communication unit 12. In one embodiment, the loop device 10 includes a loop or finger receptacle portion 20 and first 22 and second 23 base portions, the first and second base portions 22, 23 being positioned fore and aft of the loop or finger receptacle portion 20, respectively. In one embodiment, the loop device 10 is manufactured separately from the communication unit 12 and fabricated as an aftermarket or auxiliary accessory to the communication unit 12 and affixed to the unit following manufacture or during the manufacturing process. Alternatively, the loop device 10 may be formed integrally with the communication unit 12 during the manufacturing process. In either event, the loop device 10 is affixed to the communication unit 12 by the end user or the manufacturer. In one embodiment, the loop device 10 is affixed to the communication unit 12 using adhesive. In alternative embodiments, the loop device is affixed to the communication unit 12 using screws, rivets or other fasteners, such as hook-and-loop on-off fasteners—e.g., Velcro®. As seen from the foregoing, the loop device 10 is either permanently or releaseably attached to the communication unit 12, depending on the preference of the end user or manufacturer. In either case, the means by which the loop device 10 is affixed to the communication unit 12 is intended to provide sufficient bonding or attachment strength that the loop device 10 does not separate from the communication unit 12 when undergoing normal use—e.g., when the user's thumb 18 is typing on or otherwise operating a keyboard or touch screen 13 of the unit 12; the loop devices disclosed herein, alternatively, may be used as finger holders in conjunction with similar communication units—e.g., gaming consoles having keypads, touch screens or trackballs and the like—or in conjunction with other apparatus that benefit from a convenient means of holding a handheld device using one or more fingers while operating the device using the thumb of the same hand, effectively resulting in a "fingerheld" device. Further details on constructing various exemplar embodiments of the loop device 10 are provided below.

Referring now to FIGS. 3-6, construction of one embodiment of a loop device of the present invention and its affixation to a communication device is disclosed. Specifically, a loop device 110 is permanently or removeably affixed to a communication unit 112—e.g., a Blackberry® or Ipod® or stored music device. The loop device 110 includes a loop or finger receptacle portion 120 and an overlay portion 124. The loop or finger receptacle portion 120 has a first dimension or height 130 and a second dimension or width 132 that are sized such that the loop 120 fits snugly about a user's finger; typically, although not necessarily, the user's index or middle finger or a combination of the index and middle finger or simply one or more of the fingers of the user's hand. The first dimension or height 130 and the second dimension or width 132 may be equal in magnitude, resulting in a loop or finger receptacle portion 120 having a constant or substantially constant radius or diameter. The loop or finger receptacle portion 120 further includes a width 131. The width provides one aspect of creating a snug fit about the finger and, also, provides rotational stability of the unit when undergoing operation by the user's thumb—the longer the width, the more rotational stability. In one embodiment, the overlay portion 124 includes first 122 and second 123 base portions, the first and second base portions 122, 123 being appropriately sized for positioning fore 126 and aft 128 of the loop or finger receptacle portion 120, respectively. The overlay portion 124, in one embodiment, includes an underside having adhesive on the entire underside surface. Alternatives include the adhesive being positioned on the underside only at the fore 126 and aft 128 sections or the adhesive being positioned at the fore 126 and aft 128 sections in addition to adhesive being positioned at the underside of a loop section 127 of the overlay portion 124.

In constructing one embodiment of the loop device 110, the loop or finger receptacle portion 120 is constructed using non adhesive tape and positioned on the back side of the communication unit 112. The overlay portion 124 is then positioned over the loop or finger portion 120 such that the fore 126 and aft 128 sections of the overlay portion 124 are affixed to the back of the communication unit 112 and the loop section 127 is affixed to the loop or finger receptacle portion 120. In an alternative embodiment, the loop or finger portion 120 is constructed using adhesive tape with the adhesive surface on the outer side of the loop so as to adhere to either or both of the overlay portion and the back side of the communication unit 112. In one embodiment, the entire fore 126 and aft 128 sections are affixed to the back of the communication unit—e.g., the fore 126 section, extending from a first end 140 of the overlay portion 124 to a first intersection 142, and the aft 128 section, extending from a second end 144 of the overlay portion 124 to a second intersection 146, are both fully adhered to the back side of the communication unit 112. As previously disclosed, various alternatives are available for affixing the loop or finger receptacle portion 120 and the overlay portion 124 either to each other or to the backside of the communication device 112.

In one embodiment of the loop device 110, the loop or finger receptacle portion 120 has a constant or substantially constant radius or diameter as previously indicated. The magnitude of the radius or diameter is selected according to the size of the user's finger or fingers. For example, using standard ISO ring sizes (see, e.g., ISO 8653:1986), an inside loop diameter ranging from about 0.459 inches to about 0.97 inches will correspond to a ring size from about 0 to about 16. Because ring sizes are generally based on the inside diameter of the ring, it is straightforward to size the loop or finger receptacle portion 120 of the invention based on the ring size of the user's particular finger or fingers. More specifically, in one embodiment of the invention, the diametrical dimension of the overlay portion 124 is selected to correspond approximately to the largest ring size a user might be expected to require—e.g., about a size 16 ring. The loop or finger receptacle portion 120 corresponding to the size 16 ring is then affixed to the overlay portion using one of the manners described elsewhere in the specification. For fingers having ring sizes smaller than about 16, the loop or finger receptacle portion in one embodiment may be modified by increasing its wall thickness such that the outer diameter remains constant, thereby decreasing the inside diameter to correspond to the user's finger size. In such an embodiment, the material used to construct the loop or finger receptacle portion should have characteristics allowing the material to readily compress during opening and closing of the device as discussed above and below. A material having foam like characteristics is preferred for such embodiments. Alternative embodiments include selecting the diametrical or cross sectional dimensions of both the overlay portion 124 and the loop or finger receptacle portion 120 to correspond with particular finger sizes or the combined size of multiple fingers. In all cases, the outside dimension or dimensions of the loop or finger receptacle portion 120 will be approximately equal to the inside dimension or dimensions of the overlay portion when the overlay portion 124 is configured to house the loop or receptacle portion as illustrated, for example, in FIGS. 3 and 4.

It is noted, furthermore, that while the foregoing discussion employs the term "diameter" in reference to the loop or finger receptacle portion 120 and overlay portion 124, the use of such term in conjunction with these portions and ring sizes is meant to be approximate as the loop or finger receptacle portion need not necessarily be circular or even substantially circular in cross section. In still further embodiments, the length 131 of the loop or finger receptacle portion 120 is selected to cover at least a substantial distance between the finger tip and the first knuckle or, alternatively, some fraction of the distance between the tip and first knuckle. In further embodiments, the length (i.e., width 131) of the loop or finger receptacle portion 120 is selected to cover at least a substantial distance between adjacent knuckles of a finger or, alternatively, some fraction of the distance between the adjacent knuckles. Ultimately, the length of the loop or finger receptacle portion 120 may encompass a small fraction of the length of a finger or fingers, or the entire length of a finger or fingers. As stated previously, rotational stability—i.e., the ability of the user to keep the unit steady while undergoing operation using the thumb—is dependent in many respects on the length of the loop or finger receptacle portion 120.

In a preferred embodiment, the dimensions of the loop or finger receptacle portion 120 are about 0.65 inches to about 0.775 inches in inside diameter (or average diameter if the loop is not circular in cross section—see e.g., reference numerals 130 and 132) and about 0.65 inches to about 1.00 inches in length 131. A preferred thickness of the loop or finger receptacle portion 120 is about 0.004 inches to about 0.08 inches (corresponding to about 0.1 mm to about 2 mm). The dimensions of the overlay portion are correspondingly similar. This dimensional range accommodates finger sizes ranging in ISO ring sizing from about 6 to about 10. Alternative embodiments incorporate sizing the loop device to have a varying (or funnel shaped) diameter along the length of the device—e.g., the diameter of the device proximate the finger tip is preferably in the range of about 0.50 inches to about 0.65 inches, while the diameter of the device proximate the first knuckle is about 0.65 inches to about 0.775 inches, the diameter varying linearly along the length of the loop. Preferable materials for constructing the loop or finger receptacle portion 120 and the overlay portion 124 used with the preferred size range include materials having rubber-like or elastic properties such that the loop diameter is able to stretch slightly to accommodate fingers having ring sizes slightly greater than the nominal ring size corresponding to the dimensions selected for the loop 120 or overlay 124 portions. These preferred dimensions or sizing strategies are applicable to the various other and related embodiments set forth in and throughout the specification. It is noted, further, that the foregoing dimensions are preferred based on an average range of finger sizes, but in no way should be considered limiting, as finger sizes vary substantially depending on age and gender. One important criterion is that the finger fit snuggly inside the loop or finger receptacle portion 120.

An alterative embodiment that permits variance in sizing includes incorporation of a large loop or finger receptacle portion that is sized down by adjusting the positions of the fore and aft base tabs. More specifically, by repositioning the fore and aft base portions farther away from one another, a downward force is applied to the loop or finger receptacle portion, causing the loop to become more oval-like. This process has the effect of sizing down the loop portion for a smaller finger than would otherwise be the case were the loop portion to remain substantially circular with near constant inside diameter. Toward the extreme, a relatively large loop— e.g., a having an ISO finger size of 16 or larger—can be compressed sufficiently thin so that the device can be used by a person having a relatively small finger. One embodiment of this alternative employs Velcro® fasteners to affix the base portions to the communication unit so that the base portions are adjustable in the lengthwise—i.e., fore and aft directions. Another embodiment employs snap fasteners positioned at varying distances along the length of the overlay portion and beyond in the fore and aft directions.

Figure 7:
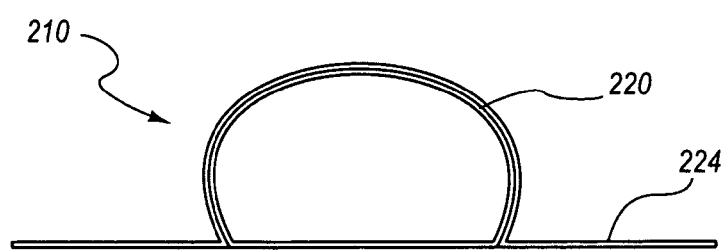
FIG. 7 illustrates a side view of the combination of overlay and finger receptacle portions illustrated in FIG. 5.
Figure 8:
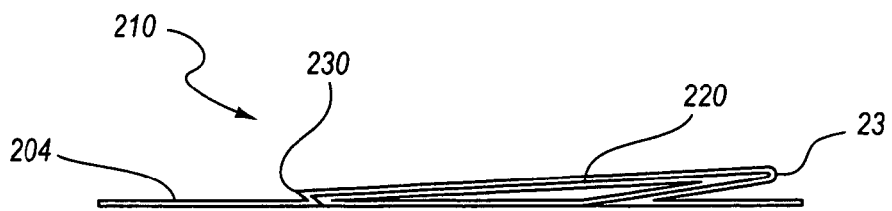
FIG. 8 illustrates a side view of the combination of overlay and finger receptacle portions illustrated in FIG. 7 following collapse of an alternative embodiment of the invention for storage.

Referring now to FIGS. 7 and 8, a further embodiment of the invention is disclosed. As illustrated in FIG. 7, a loop device 210 includes a loop or finger receptacle portion 220 and an overlay portion 224. The loop or finger receptacle portion 220 and overlay portion 224 are constructed as generally described above. As further illustrated in FIG. 8, the loop device 210 is constructed to enable collapsing of the device for storage. More specifically, the loop device 210 is configured such that the device collapses at a first point 230 and a second point 232, generally through bending of the loop device 210 at the indicated points. In one embodiment, the first point 230 coincides with the first 142 or second 146 intersections discussed previously. In alternative embodiments, the device collapses at any number of arbitrary points about the circumference of the loop or finger receptacle portion 220. If desired, the loop device 210 may be scribed or perforated at desired collapse points to facilitate collapse of the device where desired or otherwise advantageous. In one embodiment, the materials used to construct the loop or finger receptacle portion 220 and overlay portion 224 are selected to provide strength to the assembled device 210 sufficient to hold a communication device on the user's finger during operation of the communication unit with the user's thumb while, at the same time, permitting the device 210 to collapse for storage. One such material found suitable for both purposes is Scotch® High Performance Masking Tape 2693 available from 3M. This material provides the strength and resiliency necessary for use of the communication unit and compression/decompression of the loop device 210 during the closing and opening processes for storage and use, respectively.

Figure 9:
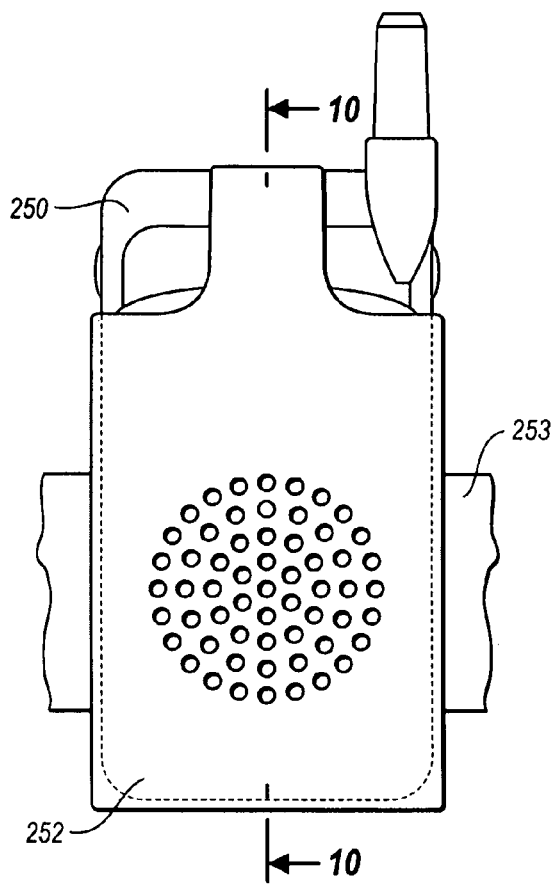
FIG. 9 illustrates an embodiment of the invention while stored in a generic holster.
Figure 10:
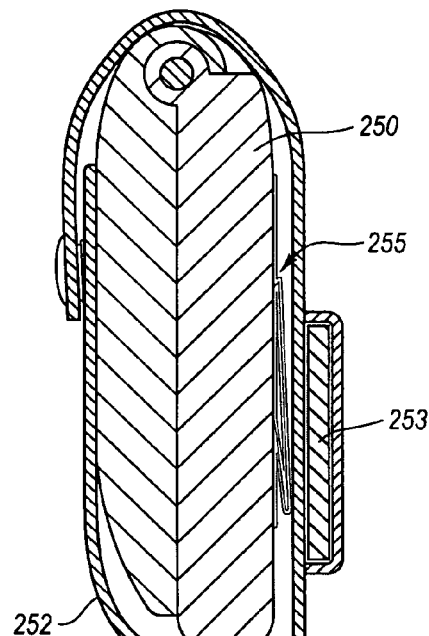
FIG. 10 illustrates a first cutaway side view of one embodiment of the present invention affixed to the backside of a communication unit and stored in the generic holster or storage sleeve illustrated in FIG. 9.
Figure 11:
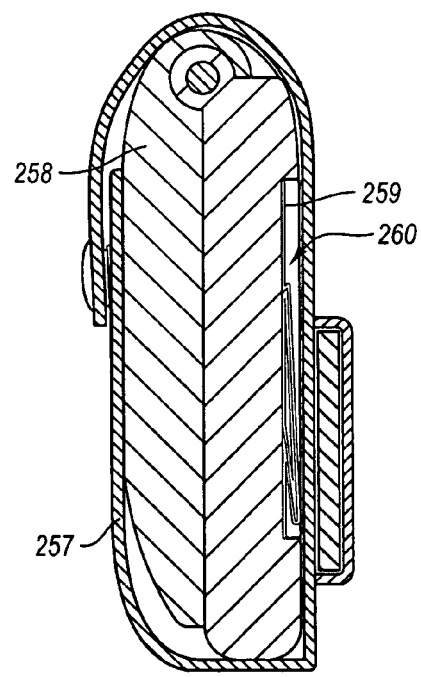
FIG. 11 illustrates a second cutaway side view of one embodiment of the present invention affixed to the backside of a communication unit and stored in the generic holster or storage sleeve illustrated in FIG. 9.

Deformability and resiliency of the loop device 210—e.g., the ability of the device to repeatedly collapse or compress or fold down and be pressed flush or nearly flush against the backside of the communication unit—permits use of cases, holsters and other accessories commonly used to store or secure communication units without interference from the loop device. The loop device is simply compressed or pressed flush or nearly flush against the backside of the communication unit prior to storage (or during the storage or holstering process) and later decompressed or unfolded following removal of the device from its storage accessory and prior to use. This aspect of the present invention is illustrated in FIGS. 9-11. Referring to FIGS. 10 and 11, for example, a communication unit 250 is shown positioned in a holster 252 configured for securing to a user's belt 253. A loop device 255 is affixed to the backside of the communication unit 250 and illustrated in the collapsed state. Prior to insertion of the communication unit 250 into the holster 252 (or during the process of insertion), the loop device 255 is collapsed by the user and the unit 250 is inserted in the holster 252 for storage. Referring also to FIG. 11, a holster 257 is again configured for storage of a communication unit 258. In this embodiment, the communication unit 258 includes a channel 259, in which a loop device 260 is positioned. This embodiment permits storage of the loop device 260 entirely within or below the surface of the backside of the communication unit 258 so that the loop device 260 does not interfere with the process of insertion of the unit 258 into the holster 257. As described below, various other embodiments of the present invention are advantageously positioned within recessed portions (or channels) of the communication device.

Figure 12:
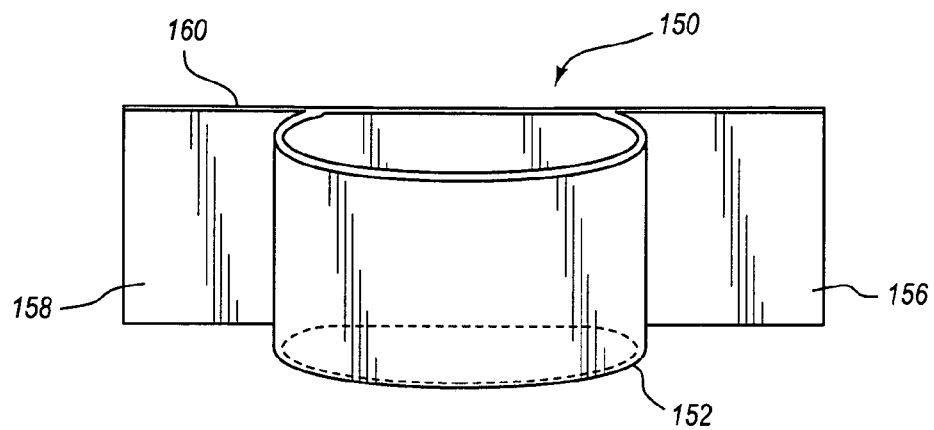
FIG. 12 illustrates a one-piece embodiment of the invention illustrated generally in FIGS. 1-8.
Figure 13:
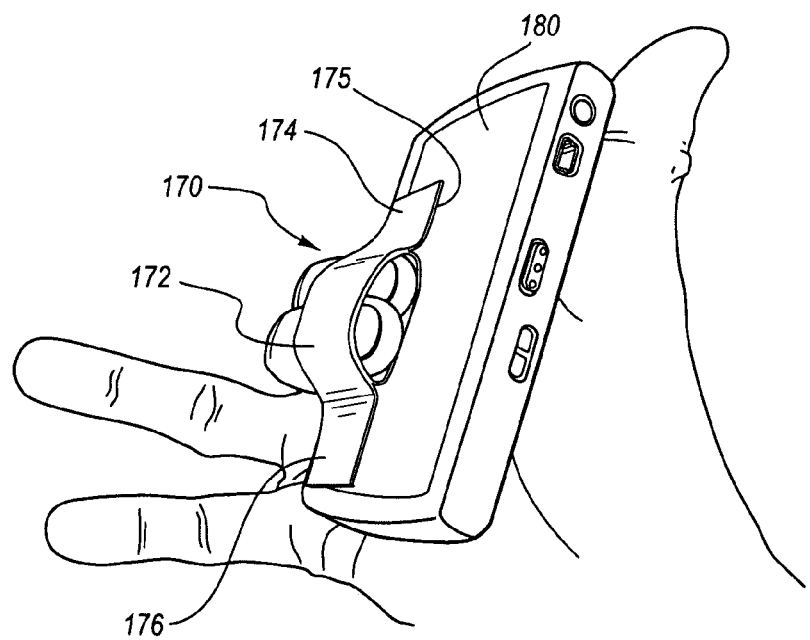
FIG. 13 illustrates a multi-finger embodiment of the present invention.
Figure 14:
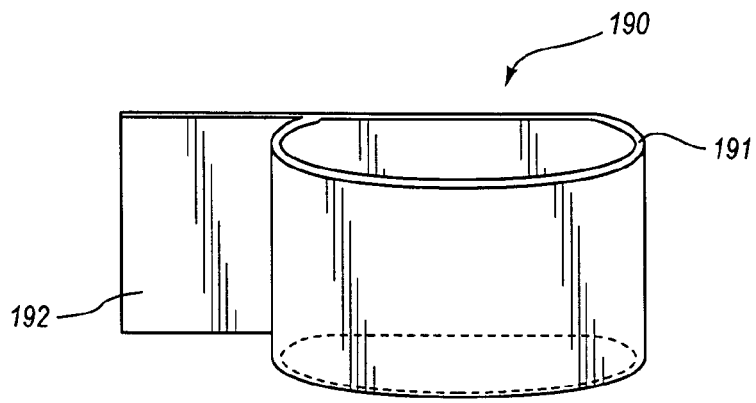
FIG. 14 illustrates an embodiment of the invention having a single base section.

An alternative embodiment to the foregoing described "two-piece" embodiments (i.e., separate loop and overlay portions) includes a "single piece" device as disclosed and illustrated in FIG. 12. A single-piece loop device 150 includes a loop or finger receptacle portion 152 and fore 156 and aft 158 sections. The fore 156 and aft 158 sections are included in a base section 160 that spans the length of the device and is configured for positioning against and affixing to the backside of a communication unit (not illustrated in FIG. 12). The loop device 150 is affixed to the communication device using any of the manners previously disclosed and is sized for use according to the same requirements discussed above. A yet further alternative to the devices disclosed above is illustrated in FIG. 13. In this embodiment, a finger loop device 170 includes a loop or finger receptacle portion 172 and a base section 175 having fore 174 and aft 176 portions for affixing to a communication unit 180. The loop or finger receptacle portion of this latter embodiment is similar to those previously described, except the loop is sized accordingly to accept two or more fingers from the user's hand. It is noted here that a still further embodiment of the variants of the present invention disclosed herein and above contemplate adhesion of only one or the other of the fore and aft portions to the communication unit. Indeed, referring to FIG. 14, in one embodiment of the invention, the fore section of the overlay portion or base section may be eliminated entirely, resulting in a loop device 190 comprising a loop or finger receptacle portion 191 and a first attachment portion 192 for affixation to the communication unit. The dimensions of the loop or finger receptacle portion are determined based on the considerations previously discussed.

Figure 15:
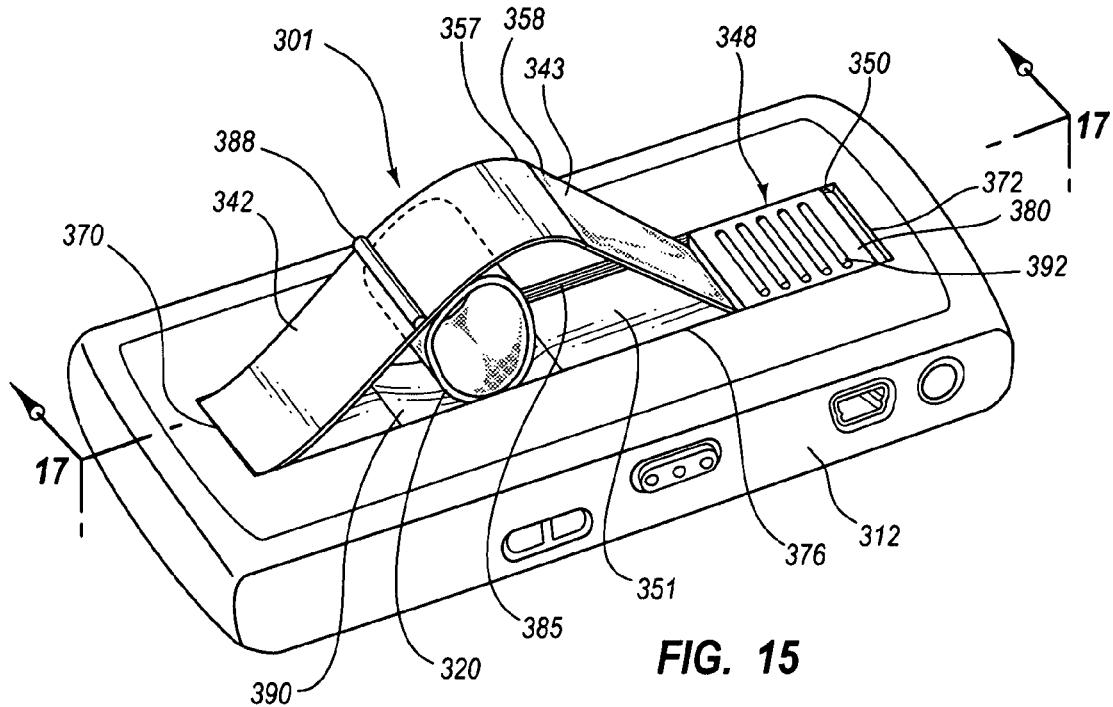
FIG. 15 illustrates an alternative embodiment of the present invention in an open or unretracted position.
Figure 16:
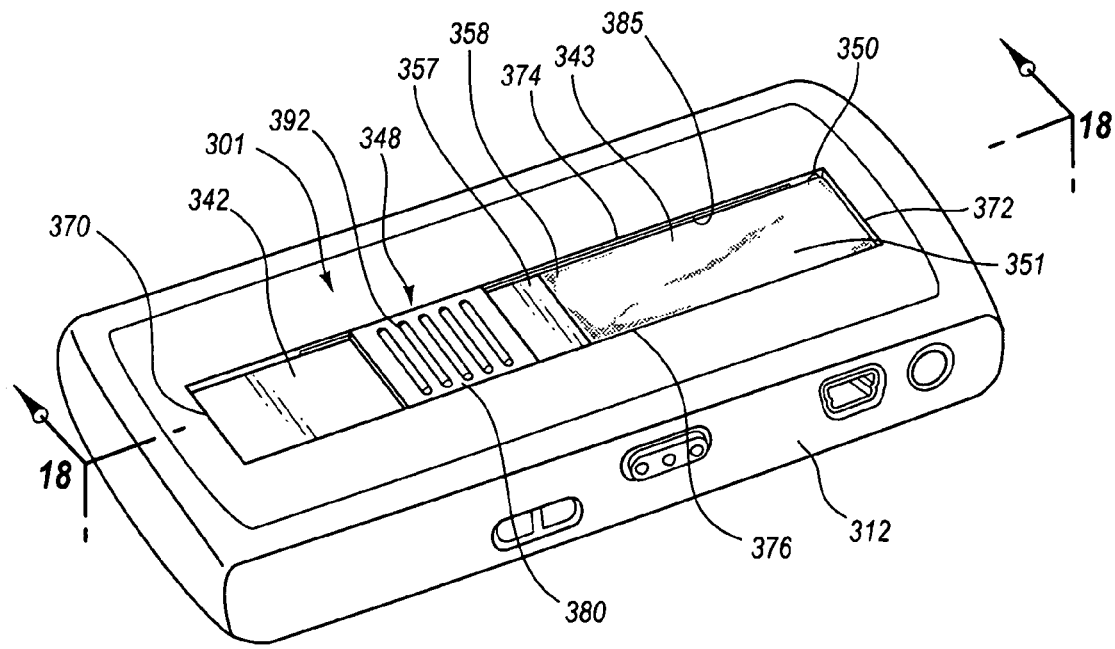
FIG. 16 illustrates the alternative embodiment of the present invention illustrated in FIG. 15 in a closed or retracted position.
Figure 17:
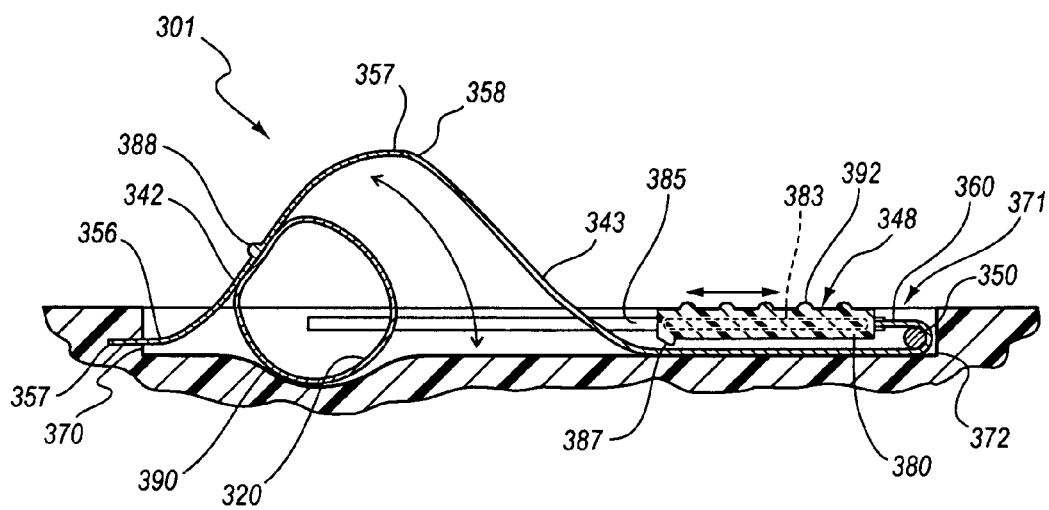
FIG. 17 illustrates a cutaway side view of the embodiment illustrated in FIG. 15 in the open or unretracted position.

Referring now to FIGS. 15-18, a still further embodiment of the invention comprises a retractable finger loop assembly 301 for attachment to or integration with a communication unit 312. In one embodiment, the retractable finger loop assembly 301 is integrated into the back side of a communication unit 312 having a recessed portion or channel 351. The recessed portion or channel has an aft end 370, a fore end 372 and first 374 and second 376 opposing side walls. The retractable finger loop assembly 301 is positioned and made operable for retraction into and extraction out of the recessed portion or channel 351. The retractable finger loop assembly 301 includes a spring element 342, a belt 343 and a finger loop 320. The spring element 342 has a first end 356 that is secured to the aft end 370 of the recessed portion or channel 351 and a second end 357 that is attached to a first end 358 of the belt 343. In one embodiment, the spring element 342 is constructed using a thin strip of spring steel, which permits the spring element to retain an original curved shape when not loaded or forced into the recessed portion or channel 351. The first end 356 of the spring element 342 is secured to the aft end 370 of the recessed portion or channel 351 in a fixed, non-rotatable manner, such that the spring element is able to function as a spring. The first end 356 of the spring element 342 may be secured in a non-rotatable manner, for example, by extending a male portion of the first end 356 into a slot-like female portion 357 at the aft end. The walls of the slot-like female portion will maintain the extended portion of the first end 356 in a fixed, non-rotatable position. Furthermore, the internal stress state in the spring element 342 is biased to spring away from the recessed portion 351 when unloaded as illustrated in FIGS. 15 and 17. The curved shape of the spring element 342 is, in the unloaded state, also selected and configured such that the finger loop 320 may have sufficient diameter or inner and outer dimensions when open to accommodate insertion of a user's finger. The user's finger (or fingers if multiple loops or large single loops are used) is then able to rest against the spring element 342 and thereby hold the communication unit 312 steady for operation of the keyboard or touch pad by the user's thumb.

The finger loop 320 is positioned between the spring element 342 and the recessed portion or channel 351 and affixed to either the spring element 342 or the recessed portion or channel 351 or both. The same or similar means of affixation previously described above may be used, although the use of adhesives is preferred. The finger loop 320 is constructed using any suitable material. For example, flexible tape as discussed above may be used. In such case, the finger loop 320 will preferably comprise several layers of tape to provide sufficient strength for use of the device during operation of the communication unit 312. The finger loop 320 may also be constructed using a rubberlike or similar material exhibiting elastic or resilient properties. The elastic or resilient properties of the finger loop allow it to retain its original loop shape or circular like appearance in cross section when the assembly 301 is retracted from the closed to the open position as discussed below. In a yet further embodiment, the finger loop 320 is constructed using a material of sufficient resilience that the spring element 342 may be replaced with flexible elastic material, similar to that disclosed below with reference to the belt 343. Here, the resilience of the material used to construct the finger loop 320 will provide the spring effect that otherwise can assist in raising the loop from the recessed portion or channel 351 for insertion of a finger or fingers by the user.

The belt 343 includes the first end 358 that is attached to the second end 357 of the spring element 342 and a second end 360 that is attached to a retractor assembly 348 which functions to drive the belt 343 and thereby raise and lower (or open and close) the spring element 342 as illustrated in FIGS. 15 and 17 and FIGS. 16 and 18, respectively. The belt 343 further includes an intermediate portion between the first 358 and second 360 ends that is positioned around a belt roller 350. The belt roller 350 is attached to the fore end 372 of the recessed portion or channel 351. The belt roller 350 preferably comprises a simple pin that extends between the first 374 and second 376 opposing side walls but may comprise an actual roller assembly that permits rotatable attachment to the opposing side walls. In one embodiment, the belt 343 is constructed using a thin piece of flexible elastic material such as nylon webbing or like materials having flexibility and sufficient elasticity and strength to operate the retractor assembly 348.

The retractor assembly 348 functions to raise and lower (or open and close) the spring element 342 (and thereby the finger loop 320) between a closed or retracted position and an open or unretracted position as illustrated in FIGS. 15 and 17 and FIGS. 16 and 18, respectfully. More specifically, referring to FIGS. 15 and 17, the retractor assembly 348 is positioned proximate the fore end 372 of the recessed portion or channel 351. When the retractor assembly is positioned at the fore end 372, the tension on the belt 343 is relaxed, thereby allowing the spring element 342 to spring away from the recessed portion or channel 351 and thereby assume its unloaded state, revealing finger loop 320. Conversely, referring to FIGS. 16 and 18, the retractor assembly is positioned at the aft end 370 of the recessed portion or channel 351. When the retractor assembly is positioned at the aft end 370, the tension on the belt is increased to a point whereby the spring element 342 is urged toward and into the recessed portion or channel 351.

More specifically, while in or translating toward the fore end 372 position, the retractor assembly releases tension on the belt 343 which, in turn, releases the load on the second end 357 of the spring element 342. As the load on the second end 357 of the spring element 342 is released, the spring element 342 springs away from the recessed portion or channel 351 due to the internal stress state within the spring element 342; the stress state is generated by forcing the second end 357 of the spring element 342 toward the recessed portion or channel 351 while preventing the first end 356 from rotating at or about the point of fixation to the aft end 370 of the channel 351. When the spring element 342 is in the raised or open position (see FIGS. 15 and 17), the finger loop 320 is exposed and open, thereby allowing a user to insert a finger (or fingers as described above in embodiments having a large loop or multiple loops) and firmly hold or position the communication unit 312 by urging the finger(s) against the spring element 342 and thereby hold or position the communication unit 312 steady for operation of the keyboard or touch pad by the user's thumb. Conversely, while in or translating toward the aft end 370 position, the retractor assembly 348 places tension on the belt 343 which, in turn, generates a load on the second end 357 of the spring element 342, thereby tending to force the spring element downward into the recessed portion or channel 351.

Figure 19:
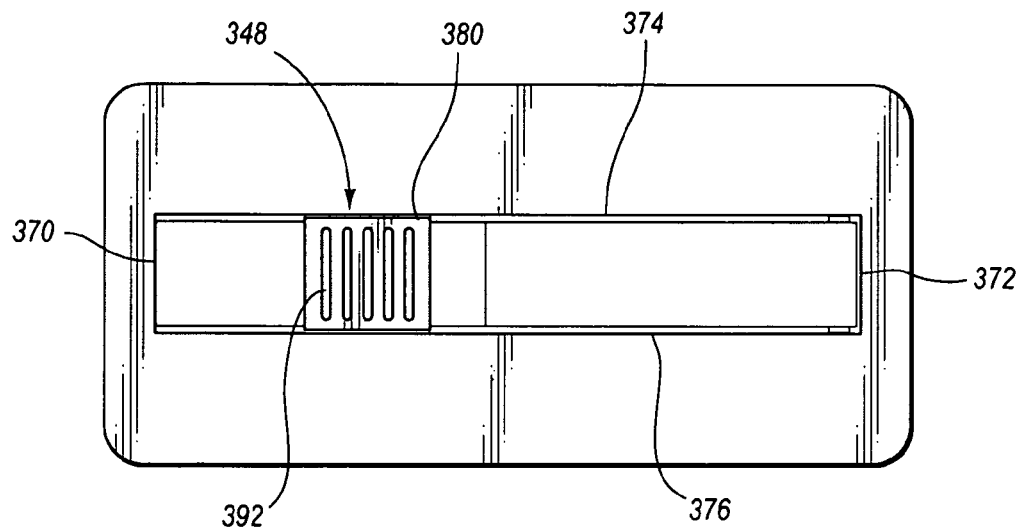
FIG. 19 illustrates a bottom view of the embodiment illustrated in FIG. 16 in the closed or retracted position.
Figure 20:
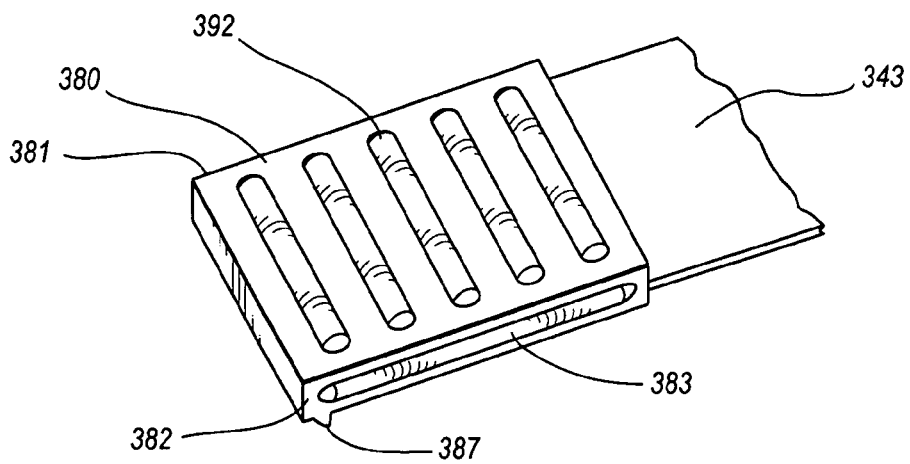
FIG. 20 illustrates a close-up perspective view of the top side of the slide element used in the embodiment of the present invention illustrated in FIGS. 15 and 16.
Figure 21:
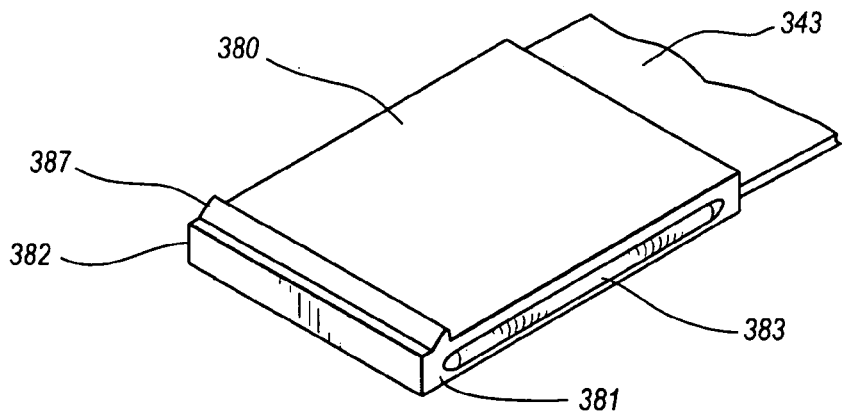
FIG. 21 illustrates a close-up perspective view of the bottom side of the slide element used in the embodiment of the present invention illustrated in FIGS. 15 and 16.

Referring now to FIGS. 19-21, together with the previously described FIGS. 15-17, further details of one embodiment of the retractor assembly 348 are described. The retractor assembly includes a slide element 380 for sliding back and forth between the fore end 372 and the aft end 370 of the recessed portion or channel 351. The slide element 380 has first 381 and second 382 side walls that are spaced a distance slightly less than the distance between the first 374 and second 376 opposing walls of the recessed portion or channel 351, thereby allowing the slide element to slide between the fore end 372 and aft end 370 positions. The slide element 380 further includes a raised portion 383 on each of the first 381 and second 382 side walls for sliding engagement with corresponding indented portions 385 on the respective first 374 and second 376 opposing walls of the recessed portion or channel 351. On the underside of the slide element 380 is a first lock portion 387 positioned and configured to releaseably engage a second lock portion 388 positioned on the spring element 342. In one embodiment, both the first 387 and second 388 lock portions are raised semi-circular rails extending along the width of the slide element 380 and spring element 342, respectively. Alternatives include one or the other of such raised lock portions being indented. Grooves or raised portions 392 (or an otherwise roughened surface) may be incorporated into or onto the upper surface of the slide element 380 to enhance traction between the surface and the thumb of the user. Further embodiments contemplate a series of first and second lock portions, enabling the slide element 380 to engage in locked positions other than fully open or closed. This latter feature permits a particular sized loop to accommodate varying sized fingers by causing the loop to be less than fully opened, thereby restricting the cross sectional dimensions of the loop to less than a full circular opening.

Figure 18:
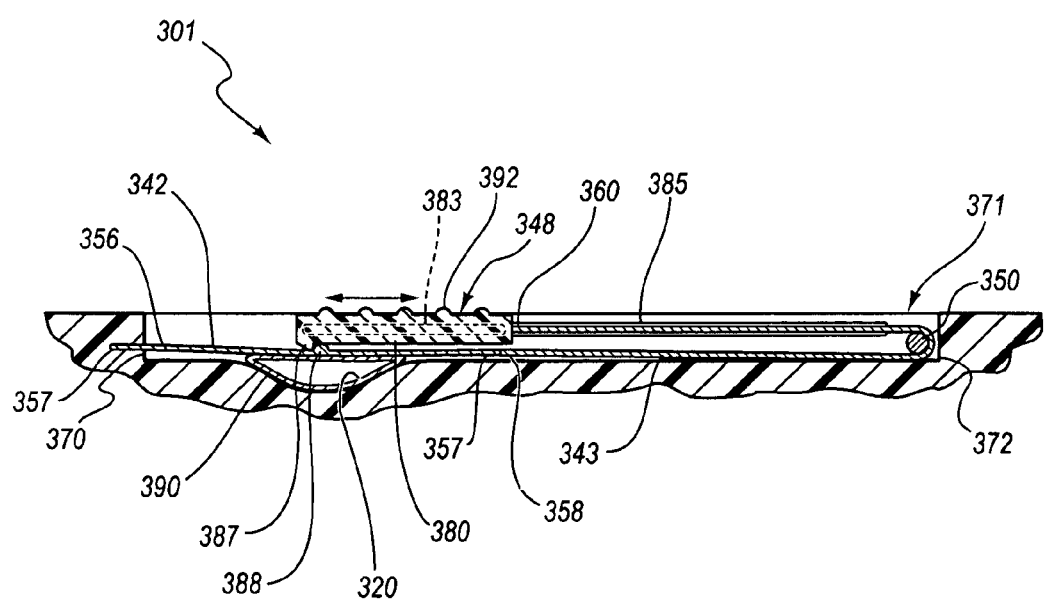
FIG. 18 illustrates a cutaway side view of the embodiment illustrated in FIG. 16 in the closed or retracted position.

Operationally, a user's thumb, for example, places the retractable finger loop assembly 301 in the lowered or closed position by sliding the slide element 380 in the aft direction until the first lock portion 387 slides aft of and then locks against the second lock portion 388 as indicated in FIGS. 16 and 18. Tension in the elastic belt 343 maintains the lock portions in contact with one another, thereby forcing the slide element 380 to maintain downward pressure on the spring element 342. The downward pressure on the spring element 342, in turn, maintains downward pressure on the finger loop 320, causing the finger loop 320 to remain in a collapsed position. In one embodiment, an indentation 390 in the floor of the recessed portion or channel 351 provides space for the collapsed finger loop 320. Conversely, the user places the retractable finger loop assembly 301 in the raised or open position by sliding the slide element 380 in the fore direction until the first lock portion 387 slides fore of and is released from the second lock portion 388 as indicated in FIGS. 15 and 17. With the slide element 380 moved away from the spring element 342, the internal stress state in the deformed spring element 342 forces it upward and away from the channel 351, thereby decompressing and opening or exposing the finger loop 320 for insertion of a finger or fingers by the user. The opening and closing (or raising and lowering) process is repeated as necessary when using the communication unit 312. Advantageously, the retractable finger assembly 301 is opened when the communication unit is being used by a user and closed when not. Further, the assembly 301 is closed when the communication unit is stored in a holster.

Figure 22:
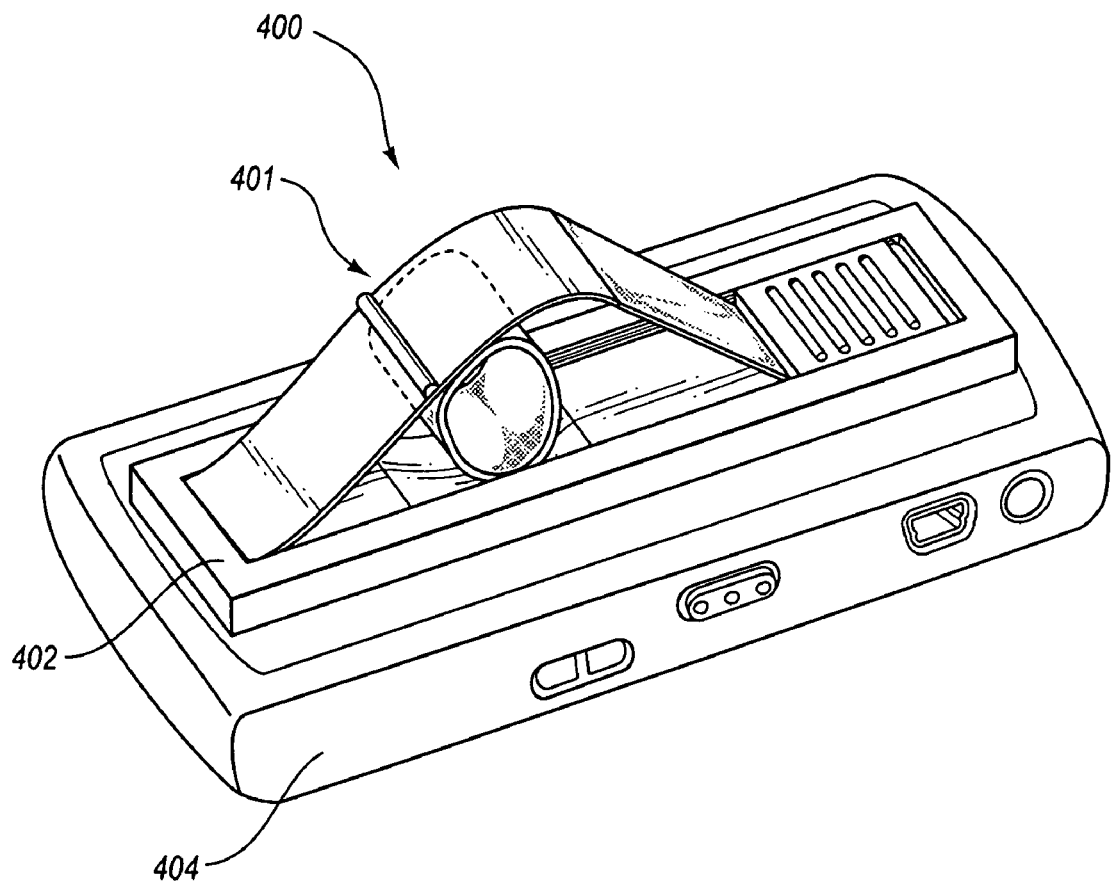
FIG. 22 illustrates an alternative embodiment of the invention shown in FIGS. 15 and 16 where the loop device is contained in a stand-alone housing.
Figure 23:
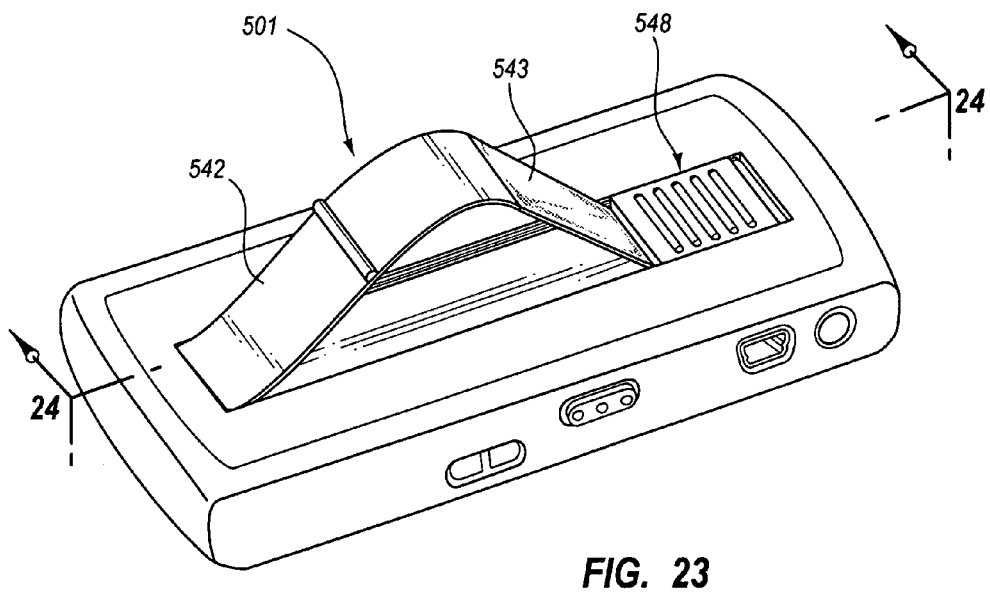
FIG. 23 illustrates an alternative embodiment of the present invention where the spring element acts as a loop.
Figure 24:
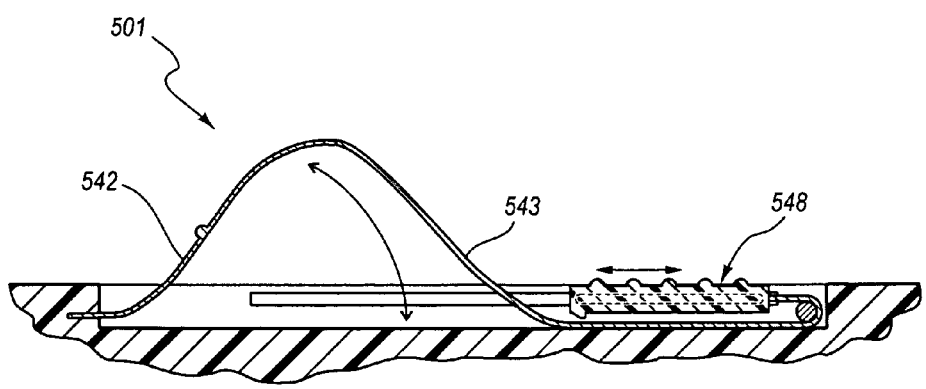
FIG. 24 illustrates a cutaway side view of the embodiment shown in FIG. 23.

The description of the foregoing embodiment has been made with respect to a recessed portion or channel 351 positioned on the backside of the communication device 312. An alternative embodiment contemplates the same or a similar structure of the just disclosed retractable finger loop assembly 301 being incorporated into a stand alone device intended for aftermarket installation to the backside of a communication device. For example, as illustrated in FIG. 22, a finger loop device 400 includes a retractable finger loop assembly 401 mounted in a housing 402. The housing 402 is sized and shaped for affixation to the back of a communication unit 404 using, for example, an adhesive or Velcro® strips. Because communication units come in varying sizes and shapes, a particular housing can also be sized and shaped to fit a particular communication unit, while the size and shape of the retractable finger unit assembly 401 remains essentially the same. Still further embodiments of the present invention contemplate removal of the previously described finger loop—e.g., finger loop 320—from the embodiments disclosed in FIGS. 15-18 and configuring the spring element for use as the "finger loop." Referring to FIGS. 23 and 24, for example, a finger loop assembly 501 includes a spring element 542, a belt 543 and a retractor assembly 548. While the spring element 542 is in the open position, as indicated, the user may slide their finger or fingers into the loop assembly 501 and operate the communication unit as described above.

Figure 25A:
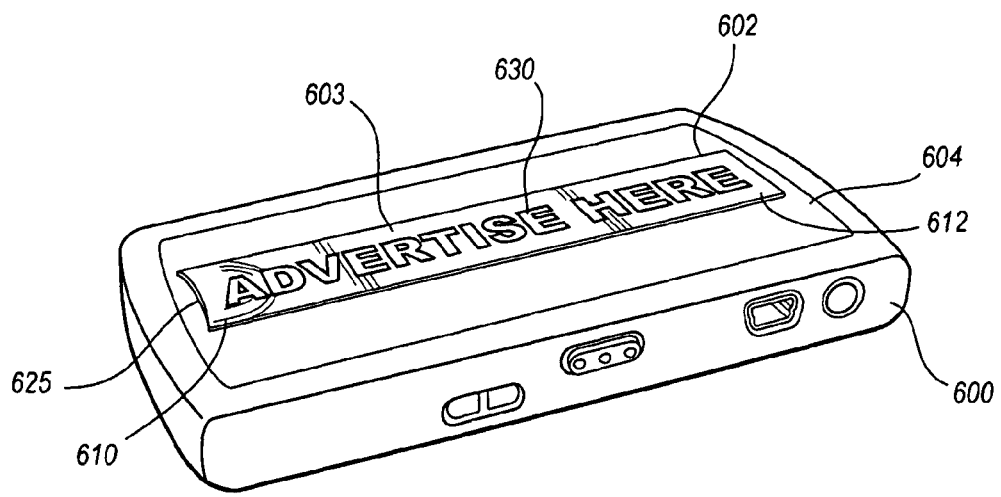
FIGS. 25A and B illustrate a yet further embodiment of a finger holder configured to lie flush against the backside of a communication unit in a first position (25A) and spring to curled unstressed state for holding by a user in a second position (25B)
Figure 25B:
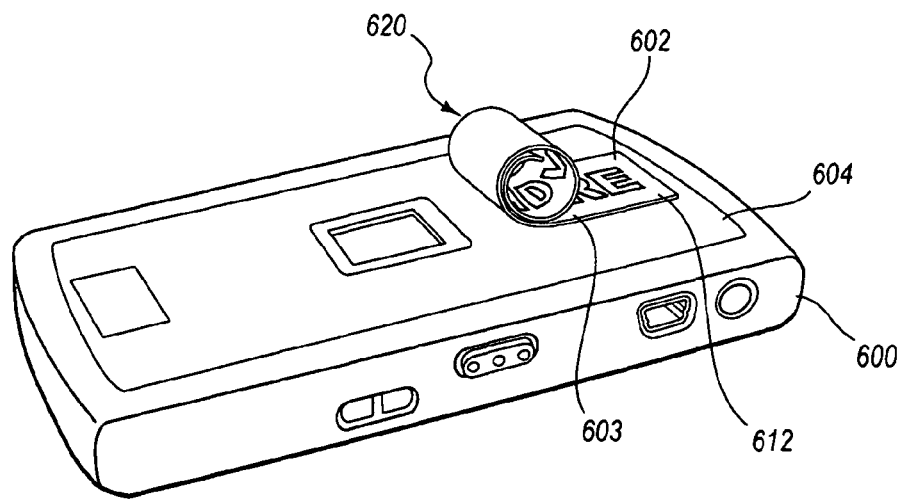
Figure 26A:
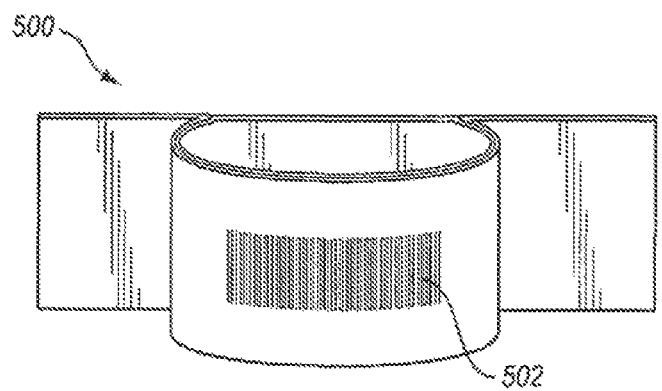
FIG. 26A-D illustrates several embodiments of the invention having identification devices mounted thereon.
Figure 26B:
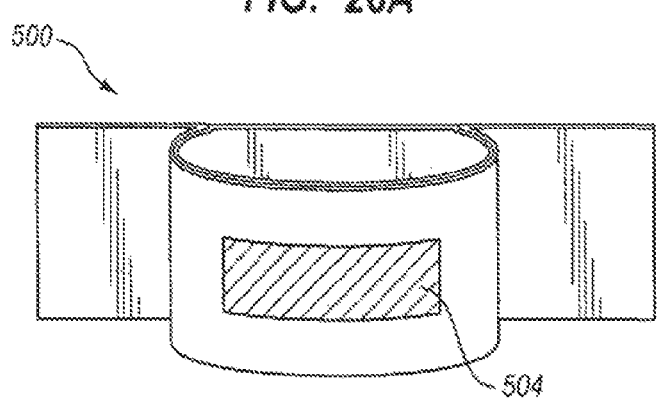
Figure 26C:
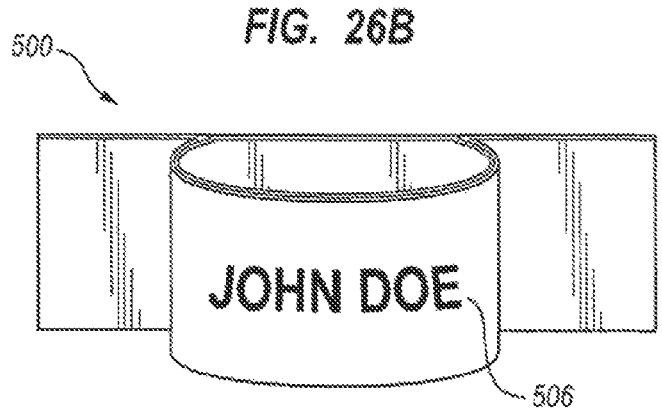
Figure 26D:
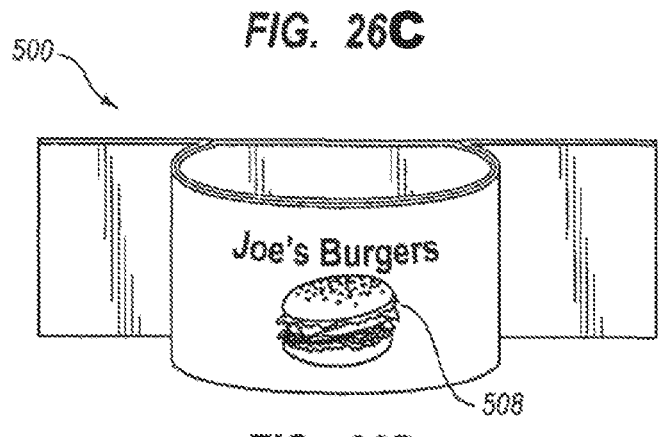

Referring to FIGS. 25A and B, a yet further embodiment of a finger holder is disclosed. In FIGS. 25A and B is shown a communication unit 600 having a loop device 602 mounted on the backside 604 of the unit. The finger loop device 602 includes a snap strip 603 having a first end 610 and a second end 612. The snap strip 603 is configured to lie substantially flat against the backside 604 of the communication unit 600 as illustrated in FIG. 25A or roll up into itself to form a loop 620 as indicated in FIG. 25B. The snap strip 603 rolls up into the loop 620 when in its unloaded or unstressed state, having one end of the strip affixed to the communication unit as indicated in the drawings. When unrolled, as shown in FIG. 25A, the snap strip 603 is caused to remain flat against the backside 604 of the communication unit 600 due to internal stresses caused by a downward curvature 625 imposed on the snap strip 603 along its length, much like the manner in which the blades of a Venetian blind remain flat (or horizontal) along their individual lengths due to the downward curvature of each of the blades. Once the curvature is upset—e.g., by a user pushing against the snap strip 603 at a point along its length—the internal stress state is relaxed, thereby causing the snap strip 603 to roll up into itself as illustrated in FIG. 25B. The snap strip is preferably constructed using a mild spring steel, but may also be constructed using a stiff plastic. While in the rolled up position, a user inserts one or more fingers into the loop 620 and operates the communication unit 600 with the thumb as described above. As discussed below, advertising or identification media 630 may be incorporated with the exposed side of the snap strip 603.

A useful aspect of the present invention is the ability to incorporate print or computer readable media onto or into the various embodiments of the loop devices. Referring to FIGS. 25A-D, for example, a finger loop device 500 is sized and configured to have sufficient surface area to accommodate identification related items, such as barcode strips 502, magnetic strips 504, personal name strips 506, corporate logo strips 508 and I.D. photographs (not illustrated) or related identifying information—e.g., name, address and telephone number of the owner of the communication unit. In one embodiment of the present invention, the identification related items are secured to the top surface of the finger loop device 500 using an adhesive. In alternative embodiments, particularly where magnetic strips or the like are concerned—e.g., radio-frequency identification (RFID) tags—the identification related items are secured within the finger loop device—e.g., between the loop or finger receptacle portion and overlay portion previously described. In those embodiments where the identification related items are secured within the finger loop device, a transparent overlay may be used to maintain visibility of the particular identification related item. Other useful information that can be stored on or in any of the loop devices of the present invention include medical information—e.g., blood type or allergy identification—and emergency contact information.

While certain embodiments and details have been included herein and in the attached invention disclosure for purposes of illustrating the invention, it will be apparent to those skilled in the art that various changes in the methods and apparatuses disclosed herein may be made without departing form the scope of the invention, which is defined in the appended claims.

What is claimed is:

1. A finger receiving device for holding a personal communication unit, comprising:
   a first loop portion configured to receive a finger of a user of the personal communication unit, said first loop portion having a length, an opening along said length and a perimeter about said opening; and
   an overlay portion, said overlay portion having a first base portion, a second base portion, and an intermediate portion positioned adjacent said first base portion and intermediate the first and second base portions, said intermediate portion being positioned adjacent at least a portion of said perimeter of said first loop portion, said first base portion extending fore of said first loop portion and positioned for affixation to said communication unit; and
   said second base portion extending aft of said first loop portion and positioned for affixation to said communication unit.

2. The device of claim 1, wherein said intermediate portion of said overlay portion has a width equal in magnitude to the length of said first loop portion.

3. The device of claim 1, wherein said first loop portion and said overlay portion are affixed to one another using an adhesive.

4. The device of claim 1, wherein said overlay portion has a length greater than twice the perimeter of the first loop portion.

5. The device of claim 1, wherein said overlay portion and said first loop portion constitute a single piece unit.

6. The device of claim 1, further comprising a second loop portion configured to receive a second finger of said user of the communication unit.

7. The device of claim 6, wherein said second loop portion is positioned adjacent said first loop portion.

8. The device of claim 1, wherein said first loop portion is constructed using an elastic material.

9. The device of claim 1, wherein said loop portion is constructed using an adhesive tape.

10. The device of claim 1, further comprising a second loop portion configured to receive a second finger of the communication unit.

11. The device of claim 1, wherein the first loop portion is affixed to the overlay portion using and adhesive and wherein the second loop portion is affixed to the overlay portion using an adhesive.

12. The device of claim 1, further comprising an identification device mounted thereon containing computer readable identification information.

13. The device of claim 12, wherein said identification device includes a barcode.

14. The device of claim 12, wherein said identification device includes a magnetic strip.

15. The device of claim 1, further comprising an identification strip containing a corporate logo.

16. The device of claim 1, further comprising an identification strip containing printed advertising media.

17. A device for holding a personal communication unit, comprising:
- a loop portion, said loop portion forming a cylindrical shape, the cylindrical shape having a circular cross-section; said circular cross-section having at least one axis;
- an overlay strip, said overlay strip having a first portion, a second portion and an intermediate portion positioned between said first and second portions, said intermediate portion being positioned adjacent to at least a portion of said loop portion;
- a base plate, said first and second portions being affixed to said base plate;
- in which the first and second portions extend aft and fore of said loop portion respectively, and in which the first and second portions are repositionable along the length of the base plate to vary the length of at least one axis.

* * * * *